E. BURHORN.
COOLING TOWER.
APPLICATION FILED NOV. 26, 1910.

1,014,371.

Patented Jan. 9, 1912.

Witnesses:
C. S. Ashley
Alexander Dickenson

Inventor
Edwin Burhorn
By his Attorney

UNITED STATES PATENT OFFICE.

EDWIN BURHORN, OF HOBOKEN, NEW JERSEY.

COOLING-TOWER.

1,014,371. Specification of Letters Patent. Patented Jan. 9, 1912.

Application filed November 26, 1910. Serial No. 594,303.

*To all whom it may concern:*

Be it known that I, EDWIN BURHORN, a citizen of the United States, and a resident of Hoboken, in the county of Hudson and State of New Jersey, have invented a certain new and useful Cooling-Tower, of which the following is a specification.

My invention relates to improvements in cooling towers and the object of my invention is to provide a simple and effective device for cooling water and like liquids. I accomplish this object by the device illustrated in the accompanying drawing in which—

Figure 1:
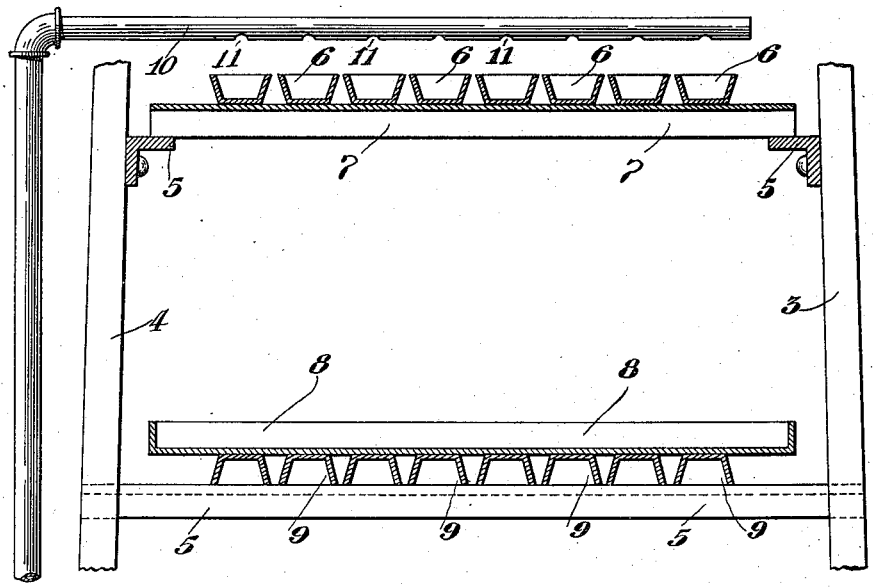
Figure 2:
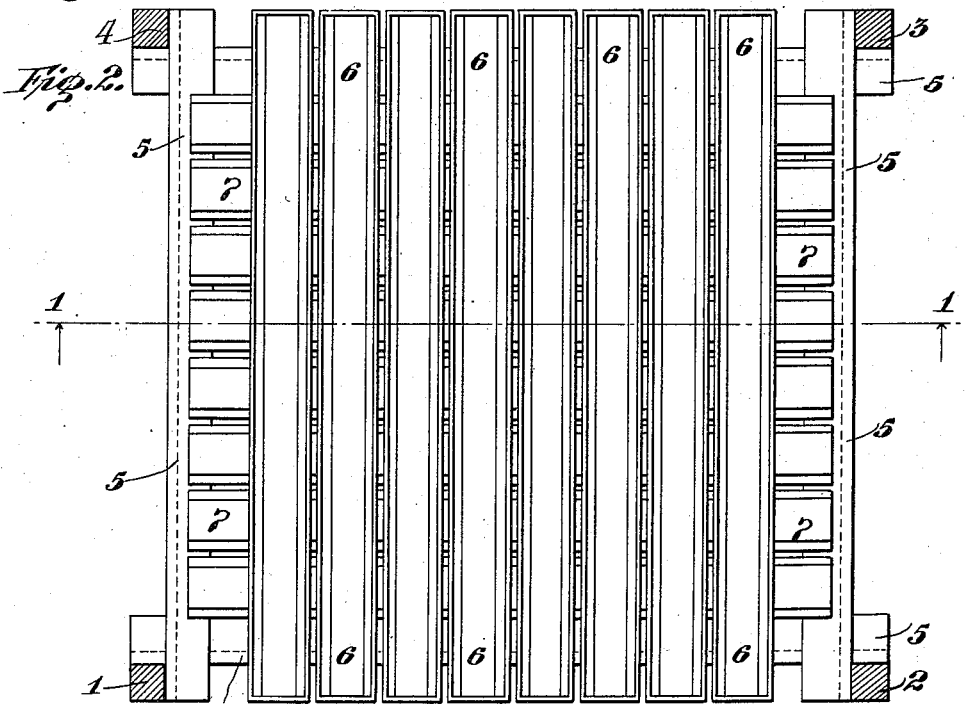

Figure 1 is a section view of the device on the line 1—1 in Fig. 2. Fig. 2 is a plan view of the same.

Similar characters refer to similar parts throughout the several views.

My device comprises a tower having a frame constructed of upright supporting members 1, 2, 3 and 4 and cross supports 5, 5, 5, preferably angle iron pieces, at each deck. Suitable cross braces may be employed as desired or as the nature of the device may require.

At suitable intervals throughout the tower I provide decks formed of a plurality of parallel diffusing and supporting members 7, 7 each having a central longitudinal web preferably extending from end to end and provided with sloping sides and a longitudinal cut out section on their under sides, and separated by a space sufficient to permit the water to fall between them and upon these diffusing and supporting members 7, 7, are set parallel open troughs 6, 6, 6 having flaring side sections and separated by a space sufficient to permit the overflowing water to fall between their edges and having their ends closed. These troughs 6 and diffusers 7 are preferably counterparts and are thus adopted to be used interchangeably resulting in economy of construction and at the same time providing a novel combined support and diffused. The sides of the diffusers are set at an angle of approximately forty-five degrees thereby securing the most efficient angle of splash whereby a considerable quantity of water is thrown over upon the adjacent diffuser, and the cut out section on the under side of the diffusers will cause the water to drop from the edges thereof to the deck below. Each deck therefore is composed of a plurality of members having sloping longitudinal sides arranged in double layers at right angles, the under or supporting layer being inverted. I prefer to so place the troughs 6 and diffusers 7 of each deck that the like troughs and diffusers of the decks above and below, will lie at right angles thereto.

My device being thus assembled the water or other liquid to be cooled is delivered to the upper deck by means of a supply pipe 10 having perforations 11, 11, 11 directly over each trough of the said upper deck so that the water from the supply pipe 10 will be delivered into the troughs 6, 6, 6 but any other means for delivering the water to the troughs 6, 6, 6 may be employed. The water so delivered into the open troughs 6, 6, 6, of the upper deck will overflow the edges of these troughs and drip or fall down and splash upon the spreading sides of the diffusers 7, 7 which will serve to spread out the water, thereby permitting it to fall in finely divided drops to the troughs 8, of the deck below from which it will overflow and fall upon the diffusers 9, 9 dropping therefrom in finely divided drops.

As many decks may be employed as may be desired and the same operation will be repeated from deck to deck throughout the tower, the water being caught at the bottom by a pan or similar receptacle, not shown, placed to receive it.

Having thus described my invention what I claim is:

1. A deck for cooling towers comprising a plurality of parallel diffusing and supporting members each having a central longitudinal web and provided with sloping sides and a plurality of parallel troughs upon the diffusing and supporting members, substantially as shown and described.

2. A deck for cooling towers comprising a plurality of parallel troughs and a plurality of parallel counterpart supporting and diffusing members arranged at right angles thereto and carrying the said troughs substantially as shown and described.

3. A deck for cooling towers comprising a plurality of parallel diffusing and supporting members each having a central longitudinal web and a longitudinal cut out section in its under side and a plurality of parallel troughs having flaring side sections and resting upon the inverted troughs at right angles thereto substantially as shown and described.

4. In a device of the character described a plurality of decks, each deck comprising a double layer of counterpart members having sloping longitudinal sides and arranged at right angles, the members comprising the supporting layer being inverted and the said counterpart members of each deck being arranged at right angles to the like members of the adjacent decks and means for supplying liquid to be cooled to the counterpart members of the upper deck substantially as shown and described.

Signed at New York in the county of New York and State of New York this 22nd day of November A. D. 1910.

EDWIN BURHORN.

Witnesses:
ADELBERT W. BAILEY,
ALEXANDER ACKERSON.

Copies of this patent may be obtained for five cents each, by addressing the "Commissioner of Patents, Washington, D. C."